Patented July 30, 1940

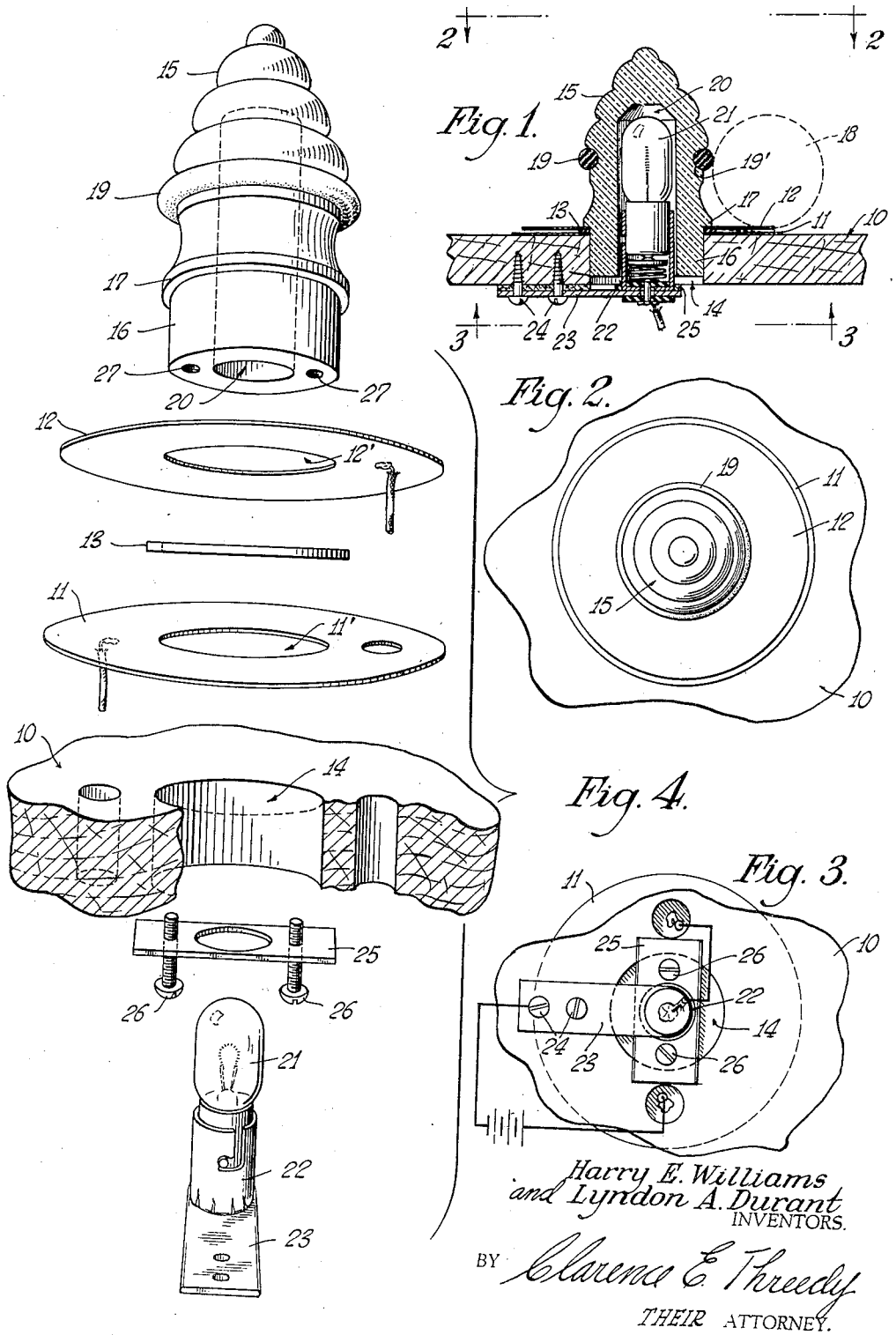

2,209,589

UNITED STATES PATENT OFFICE 2,209,589

BALL SWITCH AND BUMPER

Harry E. Williams and Lyndon A. Durant, Chicago, Ill.

Application February 27, 1939, Serial No. 258,688

6 Claims. (Cl. 200—52)

This invention pertains to a bumper and ball switch for use in amusement apparatus and has as its principal object the provision of a combined bumper and switch structure especially suited for use in bagatelle or pin ball games wherein an instrumentality such as a ball is moved over a playing surface and engages various bumper or rebound means.

Another object of the invention is the provision of a combined bumper and switch structure in which the bumper is in the form of an upstanding member on the playboard and is surrounded by a pair of parallel contact plates arranged close to the playing surface so that one of the plates will be engaged by a ball striking the bumper to contact the other plate and close a control circuit.

Another object is the provision of a bumper and ball switch of the class described, wherein the upstanding support is arranged to provide a translucent lamp housing including an electric lamp which may be in circuit with the corresponding ball switch, if desired.

Another object is the provision of a ball switch including a pair of parallel plate members insulated from each other and one of which is adapted to be mounted in closely parallel relation with the top of the playboard while the other is flexible for movement by a ball into contact with the first plate to close a control circuit.

Yet another and more specific object is the provision of a ball switch including an upright member having a shank portion formed to fit in a mounting opening in a playboard, and a pair of contact plates fitted around said shank portion so as to lie parallel to said playboard, and insulating means disposing the plates in separated open circuit condition and arranged to leave outer circumferential portions of the plates free for contacting engagement, the top plate being flexible so that a ball engaging the same will move the peripheral portions of the plate into contact with the companion plate to close the control circuit.

Other objects and advantages of the invention reside in certain details of construction of the embodiment described hereinafter in view of the annexed drawing, in which:

Fig. 1 is a vertical section through a playboard and the combined bumper and switch structure;

Fig. 2 is a top plan view in the direction of line 2—2 of Fig. 1;

Fig. 3 is a bottom plan view in the direction of line 3—3 of Fig. 1; while

Fig. 4 is an exploded perspective of the bumper and switch assembly drawn to enlarged scale.

In the arrangement of Fig. 1, the novel bumper switch is mounted on a ball playing board 10, the switch structure including a relatively stationary contact plate 11 of circular form and a relatively movable and flexible companion contact plate 12, which is of slightly smaller diameter than the stationary plate (Fig. 2) and which is mounted concentrically with the stationary plate but in spaced open circuit relation thereto by means of an insulating collar or washer 13. The plates 11 and 12 have concentric openings 11' and 12' respectively, which register with the opening in washer 13 and with an opening 14 in the playboard 10.

The contact plates of the switch structure are preferably secured in assembled operative relation by means of a support 15 having a reduced shank portion 16 below a shoulder 17 and which shank fits through the aligned openings of the contact plates and washer and into the opening 14 in the playboard, with the shoulder 17 resting closely against the top contact plate 12, the fit of the shank in the mounting hole 14 preferably being tight.

In the preferred arrangement, the upstanding support 15 preferably extends above the top of the board 10 a distance sufficient to constitute the member 15 a bumper which may be engaged by a metal or other ball 18, indicated in dotted lines. For this purpose, the upper portions of the support 15 taper from the region of the shoulder 17, the taper being sufficient to permit a desired size of ball 18 to ride substantially onto the top contact plate 12 for positive movement of the latter, as indicated in Fig. 1.

Where the member 15 is utilized as a bumper, a yieldable impact means in the form of a rubber band 19 is seated in a suitable groove 19' in the upstanding member 15 at a height to be contacted by the mid portion of the ball 18 when the latter moves toward the member 15.

It is also an object of the invention to provide a combined ball-operated switch means and illuminated bumper, and to this end the upstanding bumper member 15 is constructed of a translucent plastic or other material and has a bore or well 20 open at the bottom of the member and into which an electric lamp 21 and socket member 22 extend from the bottom of the playboard, the socket being mounted on a bracket arm 23 secured by the screws 24 to the under side of the playboard adjacent the opening 14. The lamp 21 is preferably connected in a power circuit in series with the contact plates 11 and 12 so that when the latter are engaged, the power circuit is closed and the lamp 21 will be energized. The lamp housing or bumper 15 is preferably, though not necessarily, secured on the board by a plate 25 (Figs. 3 and 4) which straddles the bottom of the opening 14 and is clamped against the latter by screws 26 threaded into tapped holes 27 in the bottom of the bumper member 15.

In the operation of the device as illustrated in Fig. 1, the ball 18 (which is preferably of metal)

may close a circuit through the switch means in one of two ways, first, by simply engaging the outer peripheral portions of both of the plates 11 and 12 so that the circuit through the latter is bridged by the ball, and second, by movement of the ball up onto the top or movable plate 12, the latter being of relatively thin metal and sufficiently flexible so that the weight of the ball will urge the plate into circuit-closing contact with the lower plate 11.

The reaction movements of the ball 18 are influenced not only by the rebound collar 19, which tends to throw the ball back away from the bumper, but also by the tendency of the upper yieldable plate 12 to be restored to its normal open circuit position, the combined effect of the restorative effort of the upper contact plate and the rebound effect of the rubber collar 19, causing the ball frequently to be repulsed from the bumper with novel reaction movements different from those which would occur if there were no reaction means in the form of the plate 12.

The switch arrangement may be modified by employing a relatively compressible insulating collar 13 of material, for example, such as sponge rubber, and by providing adequate clearances between the hole 12' in the top contact plate and the shank 16 of the bumper so that the top contact plate could yield under the weight of a ball, without itself bending, due to the yieldability of the collar 13. These and other modifications are all included within the scope and spirit of the invention as the same is defined in the appended claims.

Having thus described our invention, what we claim as new and desire to protect by Letters Patent is:

1. A bumper switch for use in amusement apparatus including a ball playing board, said switch comprising parallel contact plates arranged in closely parallel relation to the top of said board, the uppermost one of said plates being resiliently arranged for movement by the weight of a ball thereagainst into contacting engagement with the lower plate, and upstanding means constituting a bumper arranged concentrically of said plates to extend beyond said board.

2. A bumper switch for use in ball game apparatus including a ball playing board, said switch including an upstanding bumper member mounted on said board, a stationary contact disc mounted concentrically with said bumper member on said board, a movable contact disc mounted concentrically of said bumper member, and an insulating collar arranged concentrically of said bumper member between said discs and of lesser overall diameter than either of the latter so as to leave opposite contacting surfaces on outer circumferential portions of the contact discs, said second disc being arranged and constructed to yield under the weight of a ball thereon for contacting engagement with said first disc.

3. A bumper switch for use in ball game apparatus including a ball playing board, said switch including an upstanding bumper member mounted on said board, a stationary contact disc mounted concentrically with said bumper member on said board, a movable contact disc mounted concentrically of said bumper member, and an insulating collar arranged concentrically of said bumper member between said discs and of lesser overall diameter than either of the latter so as to leave opposite contacting surfaces on outer circumferential portions of the contact discs, said second disc being arranged and constructed to yield under the weight of a ball thereon for contacting engagement with said first disc, said discs extending laterally of said bumper member a distance adequate to permit a ball of predetermined diameter to rest substantially on said second disc in close proximity to said bumper member.

4. A bumper switch for use in ball game apparatus including a ball playing board, said switch including an upstanding bumper member mounted on said board, a stationary contact disc mounted concentrically with said bumper member on said board, a movable contact disc mounted concentrically of said bumper member, and an insulating collar arranged concentrically of said bumper member between said discs and of lesser overall diameter than either of the latter so as to leave opposite contacting surfaces on outer circumferential portions of the contact discs, said second disc being arranged and constructed to yield under the weight of a ball thereon for contacting engagement with said first disc, said discs extending laterally of said bumper member a distance adequate to permit a ball of predetermined diameter to rest substantially on said second disc in close proximity to said bumper member, said bumper member having a resilient member surrounding the same in a position to be contacted by a ball substantially disposed on said second disc in the manner aforesaid such that said ball striking said resilient member will rebound from the latter out of engagement with said contact disc.

5. The device described in claim 2 and further characterized in that said movable disc is of lesser diameter than said stationary disc, whereby a metallic ball engaging the peripheral or marginal portions of the discs, without moving the movable disc, will close a circuit through the contact discs.

6. A bumper switch for use in amusement apparatus including a ball playing board, said switch comprising an upstanding bumper member having a shank portion fitted into an opening in said board, a stationary contact annulus mounted on said board concentrically of said shank portion and a movable contact annulus mounted concentrically of said bumper member in spaced normally parallel relation with said stationary annulus, insulating means of lesser overall diameter than either of said annuli and arranged concentrically of said bumper member between the annuli, the movable annulus being of lesser diameter than the stationary annulus and having contact surface portions arranged opposite contact surface portions of the stationary annulus, said bumper member having shoulder means engaged with said movable annulus, mounting means engaged with said bumper member urging the shoulder means thereof against said movable annulus to secure the members in assembled relation, said contact annuli being adapted for connection in a control circuit, the movable annulus being moved by the weight of a ball into circuit closing engagement with the circuit closing annulus.

HARRY E. WILLIAMS.
LYNDON A. DURANT.